Patented Sept. 15, 1942

2,296,070

UNITED STATES PATENT OFFICE 2,296,070

TREATMENT OF METAL PRIMERS

John S. Thompson and Edwin W. Goodspeed, Detroit, Mich., assignors to Parker Rust Proof Company, Detroit, Mich.

No Drawing. Application September 22, 1936, Serial No. 102,018. Renewed July 11, 1940

10 Claims. (Cl. 117—69)

This invention relates to the field of chemically treating metal surfaces and has for its object to increase their corrosion resistance and to render them better equipped to retain final finish coats.

It is customary in the paint industry to apply a primer coat to metal surfaces before providing the finish coat of the desired type and color. There are many primers in use today of varying types fulfilling the purpose of binding the finish coats to metal surfaces, both with and without making use of a chemical undercoating such as insoluble phosphates (Bonderizing and Parkerizing).

Finish coats when applied to metal surfaces invariably have the tendency to blister and peel when subjected to corroding influences. The idea of using a priming base coat constituted a great step towards eliminating these disadvantages and even a greater advancement came with the use of chemical coatings applied directly to and integral with the metal surface. However, the present invention provides a method of improving on both of these known processes and from which benefits are derived which more than equal the slight added cost of the treatment.

It is known in the art to apply solutions to metallic surfaces to obtain corrosion resistant paint-holding chemical coatings thereon by reaction of the solutions with the metal. To these surfaces are then applied priming coats and finish coats. Attempts have been made to combine rust-proofing and priming chemicals, or rust-proofing and finish coat chemicals but in most cases coatings obtained have not been satisfactory.

Our invention does not concern either of these processes but relates in general to applying chemical rust-proofing solutions after application of the priming coat.

In carrying out our invention, a metallic surface is cleaned and then covered with a priming coat or a first finish coat. A rust-proofing solution is then applied over the priming coat and the article is then finished in the usual manner. Although this process dispenses entirely with a pre-treatment by a rust-proofing solution prior to the application of the priming coat, the pre-treatment may be retained if desired.

The advantages of the invention lie in the elimination of cumbersome equipment now used in applying rust-proofing solutions to metallic surfaces prior to the priming coat. In carrying out our invention it is necessary to have as equipment merely the ordinary spray guns which are used in most factories to apply paints, enamels, lacquer, etc. Further advantages lie in the fact that only enough solution is used to cover the priming coat and thus none is lost. Furthermore there is no opportunity for contamination to build up in the solution as is the case with present rust-proofing methods where after use for a period of time the solution must be dumped. The following detailed description is given by way of illustration and not limitation.

We have found that in carrying out the invention, decidedly superior results are obtained by using solutions containing phosphoric acid and/or dihydrogen phosphates. Other phosphates may be present but when they are it is desirable to have some phosphoric acid present also. Chromic acid and salts of chromic acid have also been found to be very advantageous for carrying out the process. The specific examples indicate other solutions which have been used to advantage in the invention:

Example 1.—A steel object is first coated with a primer surfacer (Ditzler XP-301 which is a primer containing a synthetic resin with the other usual primer ingredients including pigments and fillers) and allowed to air dry for a short period of time. When no longer "tacky" it is sprayed by means of a compressed air spray gun with a solution containing 40 grams per liter of $CrO_3$. The spraying is continued just long enough to thoroughly cover the surface and after air drying a few minutes is then given the regular primer bake of 60 minutes at 275° F. When this is done the article is ready for a final finish coat.

Example 2.—A steel article is first coated with an oil base primer (Ditzler Primer XP-245) and is then baked for 60 minutes at 275° F. A solution containing 100 cc. of 75% phosphoric acid per liter of water is then sprayed upon the primed surface in an atomized spray from a compressed air spray gun. After air drying for several hours the surface is ready for a final finish coat.

Example 3.—360 grams of $Fe_2O_3$ is mixed with 250 cc. of water and ground in a ball mill until the $Fe_2O_3$ is in finely divided form and mixed thoroughly with the water. To 100 cc. of this mixture are added 40 cc. of water, 20 cc. of 75% phosphoric acid, 50 cc. of a mixture of 1 gram of modified phenol resin (Beckosol Resin #3) per 1.75 cc. trichlorethylene and 3 cc. of a 10% solution of a sodium salt of a sulphonated aryl compound (Aresklene). The resulting mixture is applied to steel articles as a primer and air dried for a period of several hours. To this surface is then applied a solution of 715 cc. of 75% phosphoric acid, 482 grams of CrO₃ and 216 cc. of water, diluted one part of this mixture to 20 parts of water. The steel article is then baked for one-half hour at 400° F. After this treatment the article is ready for a final finish of paint, enamel, lacquer or the like.

*Example 4.*—The following solutions were applied to steel surfaces in a manner analogous to that disclosed in Examples 1, 2 and 3. The steel surfaces were first coated with a synthetic primer surfacer. The primer was sprayed and allowed to dry about thirty minutes in each case before the application of the rust-proofing solutions.

(a) Chromic acid 10 to 80 grams per liter.
(b) 75% phosphoric acid 100 to 400 cc. per liter.
(c) Phosphoric acid 715 cc., chromic acid 482 grams and water 2000 cc.
(d) Phosphoric acid 715 cc., chromic acid 482 grams, and water 1000 cc.
(e) Phosphoric acid 358 cc., chromic acid 482 grams, and water 4000 cc.
(f) Zinc dihydrogen phosphate 200 grams per liter plus .01% copper.
(g) Zinc dihydrogen phosphate 200 grams per liter plus .01% nickel.
(h) Manganese dihydrogen phosphate 200 grams per liter plus .01% copper or .01% nickel.
(i) Ferrous dihydrogen phosphate 200 grams per liter plus .01% copper or .01% nickel.
(j) Ammonium dihydrogen phosphate 200 grams per liter plus .01% copper or .01% nickel.
(k) Ferric oxalate 200 grams per liter.

After the application of these various chemicals, the articles were air dried a few minutes, then baked one hour at 275° F. The finishing coat was then applied.

*Example 5.*—In a manner analogous to that disclosed in the preceding examples, steel surfaces were given a coating of an oil base primer and were then treated with the rust-proofing solutions described in the preceding examples. The following solutions were also used on oil base primers.

(a) Ferrous sulfate 200 grams per liter.
(b) Oxalic acid 200 grams per liter.
(c) Acetic acid 200 cc. per liter.
(d) Ammonium hydroxide 500 cc. per liter.
(e) Zinc sulfate 200 grams per liter.

*Example 6.*—Steel surfaces were coated with a synthetic primer in the usual manner and were then air dried. They were then sprayed with one of the following solutions:

(a) Phosphoric acid 100 cc. per gallon.
(b) Zinc dihydrogen phosphate 2 lbs.
   Nitric acid 0.3 lb.
   Sodium nitrate 0.3 lb.
   Copper carbonate 0.01 lb.
   Water 2.3 lbs.
(c) The same combination of chemicals as in (b) diluted 10 times.

In using a solution containing zinc dihydrogen phosphate, the phosphate may be used alone or with any one or more of the group of nitric acid, sodium nitrate or copper carbonate. After application of the solutions the articles were baked for one hour at 275° F. and then finished with a lacquer coating.

*Example 7.*—A coating of regular black baking enamel was baked on a steel article and then treated with a solution of phosphoric acid with a concentration of 100 cc. per liter. The article was then baked and another coat of enamel applied and baked at the usual temperature of 450° F. In place of the phosphoric acid, chromic acid has been employed.

*Example 8.*—Surfaces of aluminum, tin, lead, terne plate and magnesium carrying a priming coat of paint or a first finish coat were treated as in the preceding examples with one of the following solutions:

(a) Chromic acid 40 grams per liter.
(b) Phosphoric acid 100 grams per liter.
(c) Ferric chromate 100 grams per liter (suspension).

The articles were then finished up in a manner analogous to that described in the preceding examples.

*Example 9.*—Surfaces of magnesium containing a priming coat or a first finish coat were sprayed with one of the following solutions:

(a) Sodium chromate 100 grams per liter.
(b) Sodium dichromate 100 grams per liter.
(c) Ferric chromate 100 grams per liter (suspension).

The articles were then finished up in the usual manner.

Although in many cases they are unnecessary, wetting agents may be employed in the solutions of this invention. Most of the ordinary wetting agents are suitable including alcohols and sulphonated alcohols.

As already indicated in the examples, the article may be air dried or baked after application of the solutions in the invention and before the application of the finish coats.

Phosphate solutions are more effective with the oil base primer than with the synthetic primer but lower concentrations of phosphoric or chromic acid are most effective with the synthetic primer. Mixtures of chromic and phosphoric acids are also more effective with the synthetic primer.

The priming paints referred to in this application and the first finish paints are well known in the trade as are also black baking enamels. Oil base primers usually contain drying oils while synthetic primers contain synthetic resin such as polyhydric alcohol-polybasic resins or phenol formaldehyde resins.

Combinations of phosphoric acid with normal zinc phosphate and also with zinc dihydrogen phosphate are among the solutions which have been used to advantage as have also solutions containing chromic acid and barium chromate and/or sodium chromate or sodium dichromate. With solutions containing phosphoric acid, the various chromates may also be employed. It has been found advantageous in many cases to use phosphates in solutions containing chromic acid.

In general we have found that mixtures of any ingredients disclosed in the above examples may be used to advantage in the solutions of the invention.

It is within the scope of this invention to apply the solutions at any time after the priming coat has been applied to the metallic surface. However, in order not to spoil the primer coating it is obvious that it should be allowed to dry to such an extent that the application of the rust-proofing solution will not remove any substantial amount of the primer coat from the metallic surface.

The solutions made up in accordance with this invention may vary considerably as to concentrations. Where chromic acid is used alone as little as 1 gram of CrO₃ per liter and as much as 150 grams of $CrO_3$ per liter have been used to advantage. Where phosphoric acid alone is used as little as 4 cc. of 75% phosphoric acid has been used and as much as 300 cc. diluted with water to make one liter, have been used with satisfactory results. For this reason, the invention will be understood to include solutions varying in concentration from very dilute up to very concentrated solutions.

The solutions provided for in this invention may be applied in any suitable manner. Among the methods which have been found to be satisfactory are:

(1) Where the articles to be treated are immersed in the treating solution.

(2) Where the solution is sprayed on to the surface by means of a mechanical spraying machine in which the solution is sprayed on to the surfaces, drained off, collected and resprayed in a continuous operation.

(3) Where the solution is sprayed on to the primed surface by means of a compressed air spray gun.

In the latter method it is preferred that the solutions be atomized to a fine degree and sprayed at a pressure of approximately 60 lbs. in order to achieve uniform wetting.

While the invention has been illustrated by describing application to particular types of metallic surfaces, in its broad form it covers metals generally, including zinc, although the most beneficial results have been obtained on iron or steel.

In the following claims the expression "paint coat" is used to denote a film produced upon the surface of the metal by solidification of materials applied thereto in a vehicle substantially free from water which includes paints, lacquers, enamels and the like, as distinguished from a coat formed by chemical reaction, said reaction being largely with the metal to form with the metal of the surface a substantially insoluble salt.

What we claim is:

1. A method of treating articles with metallic surfaces containing a paint coat, which comprises applying thereto an aqueous solution of rust-proofing materials and then applying finish coats in the usual manner.

2. In the art of providing metallic surfaces with corrosion resistant and finish coatings, the steps which comprise first obtaining the usual priming coat on the metallic surfaces and thereafter applying an aqueous solution of rust-proofing materials and then finishing the metallic surfaces by application of any of the usual finish coats.

3. In the art of rust-proofing and priming metallic surfaces, the steps which comprise first obtaining a paint coat upon the metallic surfaces, then applying an aqueous solution of rust-proofing materials and thereafter applying any of the usual finish coats.

4. A process which comprises treating a metallic surface carrying a primer paint coat with an aqueous solution containing one of the group consisting of phosphoric acid, phosphates and mixtures and thereafter applying any of the usual finish coats.

5. A process which comprises treating a metallic surface carrying a primer paint coat with an aqueous solution containing one of the group consisting of chromic acid, chromates and mixtures thereof and thereafter applying any of the usual finish coats.

6. A process which comprises treating a metallic surface containing a primer paint coat with an aqueous solution containing one of the group consisting of oxalic acid, oxalates and mixtures thereof and thereafter applying any of the usual finish coats.

7. A process in accordance with claim 3 in which the surface treated is steel.

8. In the art of rustproofing and priming metallic surfaces, the steps which comprise first obtaining a paint coat upon iron or steel surfaces and then applying an aqueous solution containing one of the group consisting of phosphoric acid and phosphates and thereafter applying any of the usual finish coats.

9. In the art of rustproofing and priming metallic surfaces, the steps which comprise first obtaining a paint coat upon iron or steel surfaces and then applying an aqueous solution containing one of the group consisting of chromic acid and chromates and thereafter applying any of the usual finish coats.

10. In the art of rustproofing and priming metallic surfaces, the steps which comprise first obtaining a paint coat upon iron or steel surfaces and then applying an aqueous solution containing one of the group consisting of oxalic acid and oxalates and thereafter applying any of the usual finish coats.

JOHN S. THOMPSON.
EDWIN W. GOODSPEED.